(12) United States Patent
Sunaga et al.

(10) Patent No.: US 6,197,894 B1
(45) Date of Patent: *Mar. 6, 2001

(54) PREPARATION OF HYDROGENATED PRODUCT OF CYCLIC OLEFIN RING-OPENING METATHESIS POLYMER

(75) Inventors: Tadahiro Sunaga, Kanagawa; Masumi Okita, Osaka; Tadashi Asanuma, Chiba, all of (JP)

(73) Assignee: Mitsui Chemicals, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/084,593

(22) Filed: May 27, 1998

(30) Foreign Application Priority Data

May 28, 1997 (JP) ...................................... 9-138485
Nov. 4, 1997 (JP) ...................................... 9-301786

(51) Int. Cl.$^7$ ...................................... C08F 8/04
(52) U.S. Cl. ...................... 525/338; 525/332.1; 525/379; 525/382
(58) Field of Search ................... 525/338, 339, 525/326.1, 379, 382, 332.1

(56) References Cited

U.S. PATENT DOCUMENTS

| | | | |
|---|---|---|---|
| 5,075,388 | * 12/1991 | Rempel et al. | 525/338 |
| 5,202,388 | * 4/1993 | Iio et al. | 525/339 X |
| 5,462,995 | * 10/1995 | Hosaka et al. | 525/338 X |
| 5,539,060 | * 7/1996 | Tsunogae et al. | 525/338 |

FOREIGN PATENT DOCUMENTS

| | | |
|---|---|---|
| 03174406 | 7/1991 | (JP) . |
| 04363312 | 12/1992 | (JP) . |
| 05239124 | 9/1993 | (JP) . |
| 07041549 | 2/1995 | (JP) . |

OTHER PUBLICATIONS

"Polymerization of Norbornene by Modified Ziegler Catalyst", by Takeo Saegusa, et al., *Die Makromolekulare Chemie* 78 (1964) pp. 231–233.

"Polymerization of Norbornene by Modified Ziegler Catalysts", by Takashi Tsujino et al., *Die Makromolekulare Chemie* 85 (1965) pp. 71–79.

"Survey of Catalyst Systems", *Olefin Metathes*, (K.J. Ivin, Academic Press, New York, 1983) pp. 13–42.

"Hydrogenation of Olefins", *Hydrogenation Method*, (Paul N. Rylande, Academic Press, New York, 1985) pp. 29–52.

* cited by examiner

*Primary Examiner*—Fred Teskin
(74) *Attorney, Agent, or Firm*—Burns, Doane, Swecker & Mathis, L.L.P.

(57) ABSTRACT

An olefin ring-opening metathesis polymer is hydrogenated to obtain a hydrogenated product thereof in high yield. A specialized olefin ring-opening metathesis polymer is hydrogenated in the presence of hydrogen using a catalyst consisting of an amine compound and a metallic complex of an organic phosphorous compound represented by the general formula (1):

$$MH_k Q_m T_p Z_q \qquad (1)$$

wherein k is an integer of 0 or 1, m is an integer of 1 to 3, p is an integer of 0 or 1, q is an integer of 2 to 4, M is ruthenium, rhodium, osmium, iridium, palladium, platinum or nickel atom, H is hydrogen atom, Q is a halogen atom, T is CO, NO, toluene, acetonitrile or tetrahydrofuran, Z is an organic phosphorous compound represented by the general formula (2):

$$PR'^1 R'^2 R'^3 \qquad (2)$$

wherein P is phosphorous atom, $R'^1$, $R'^2$ and $R'^3$ may be the same or different from each other and are individually selected from the group consisting of a linear, branched or cyclic alkyl group, a linear, branched or cyclic alkenyl group, a linear, branched or cyclic aryl group, a linear, branched or cyclic alkoxy group and a linear, branched or cyclic aryloxy group.

5 Claims, No Drawings

PREPARATION OF HYDROGENATED PRODUCT OF CYCLIC OLEFIN RING-OPENING METATHESIS POLYMER

BACKGROUND OF THE INVENTION

The present invention relates to a process for preparing a hydrogenated product of a cyclic olefin ring-opening metathesis polymer.

The hydrogenated products of a cyclic olefin ring-opening metathesis polymer and copolymer have attracted attention as resins having excellent optical and electric properties, high rigidity, heat resistance and weather-tightness. Therefore, many processes for preparing various ring-opening metathesis polymers and hydrogenated products of the polymers have been proposed.

Some processes for hydrogenating carbon-carbon double bonds in the main chain of a cyclic olefin ring-opening metathesis polymer are known. For example, heterogeneous catalysts that are metal-supported catalysts are used. In the catalysts, a metal such as palladium, platinum, rhodium, ruthenium or nickel is supported on a carrier such as carbon, silica, alumina, titania, magnesia., diatomaceous earth and synthetic zeolite. JP-A-3-174406 (Tokkaihei) and JP-A-4-363312 (Tokkaihei) each disclose a process in which some of these catalysts are used to hydrogenate ring-opening metathesis polymers.

In homogeneous catalysts, nickel naphthenate/triethylaluminum, nickel acetylacetonate/triisobutylaluminum, cobalt octenate/n-butyllithium, titanocene/diethylaluminummonochloride, rhodium acetate, dichlorobis (triphenylphosphine)palladium, chlorohydridocarbonyltris(triphenylphosphine)ruthenium or chlorotris(triphenylphosphine)rhodium is used. JP-A-5-239124 (Tokkaihei) and JP-A-7-41549 (Tokkaihei) each disclose a process in which some of these catalysts are used to hydrogenate ring-opening polymers.

However, the hydrogenation reaction is heterogeneous when a metal-supported catalyst is used. Therefore, there is a problem in that such catalyst is used in large quantities to obtain high hydrogenation rate. On the other hand, the homogeneous catalyst has a property that the hydrogenation reaction proceeds even when small amounts of the catalyst are used. However, the Ziegler catalysts consisting of an organic salt of nickel, cobalt or titanium and an organometallic compound containing a metal such as aluminum, lithium, magnesium or tin are deactivated by water, air or polar compounds. Therefore, there is a problem in that the treatment is complex and a solvent having large polarity can not be used.

Furthermore, there is a problem in that metallic complexes such as a complex of rhodium are expensive and their activity is not always high enough. These catalysts have a large steric hindrance to, for example, the hydrogenation of a cyclic olefin ring-opening metathesis polymer because there is a bulky tricyclododecenoic ring in the neighborhood of the carbon-carbon double bond in the ring-opening metathesis polymer. Therefore, it has been considered that it is difficult to hydrogenate the polymer in high hydrogenation rate. Especially it has been considered that it is difficult to hydrogenate the polymer in high hydrogenation rate when there are polar substituents such as hydroxyl, carbonyl, carboxyl, and nitrile groups in the ring-opening metathesis polymer.

Therefore, there have been demands for processes in which hydrogenation is easily carried out in high hydrogen conversion even in a cyclic olefin ring-opening metathesis polymer having a polar substituent such as nitrile group.

SUMMARY OF THE INVENTION

A general object of the present invention is to provide a new process that is free from the above-mentioned problems and that enables the preparation of a hydrogenated product of a cyclic olefin ring-opening metathesis polymer.

The present inventors earnestly studied a process for preparing a hydrogenated product of a cyclic olefin ring-opening metathesis polymer that is free from the above-mentioned problems to complete the present invention.

That is, one object of the present invention is to provide a process for preparing a hydrogenated product of a cyclic olefin ring-opening polymer. The process comprises the steps of hydrogenating a ring-opening metathesis polymer of a cyclic olefin represented by the general formula (1):

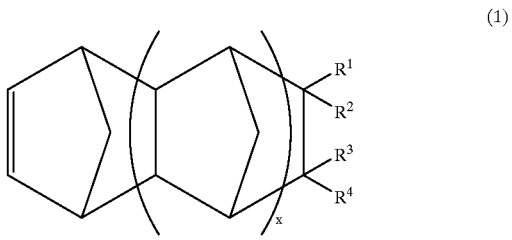

(1)

wherein $R^1$, $R^2$, $R^3$ and $R^4$ may be the same or different from each other and are individually one member selected from the group consisting of hydrogen atom, an alkyl group having 1 to 12 carbon atoms, an aryl group, an aralkyl group, an alkoxy group, a halogen atom, a halogenated alkyl group having 1 to 12 carbon atoms, cyano group, carboxyl group and an alkoxycarbonyl group and x is an integer of 0 to 3 in the presence of hydrogen using a hydrogenation catalyst consisting of an amine compound and an organometallic complex represented by the general formula (2):

$$MH_kQ_mT_pZ_q \qquad (2)$$

wherein k is an integer of 0 or 1, m is an integer of 1 to 3, p is an integer of 0 or 1, q is an integer of 2 to 4, M is a ruthenium, rhodium, osmium, iridium, palladium, platinum or nickel atom, H is a hydrogen atom, Q is a halogen atom, T is CO, NO, toluene, acetonitrile or tetrahydrofuran, Z is an organic phosphorous compound represented by the general formula (3):

$$PR'^1R'^2R'^3 \qquad (3)$$

wherein P is phosphorous atom, $R'^1$, $R'^2$ and $R'^3$ may be the same or different from each other and are individually one member selected from the group consisting of a linear, branched or cyclic alkyl group, a linear, branched or cyclic alkenyl group, a linear, branched or cyclic aryl group, a linear, branched or cyclic alkoxy group and a linear, branched or cyclic aryloxy group.

DESCRIPTION OF THE PREFERRED EMBODIMENTS

As cyclic olefin monomers of the present invention that are represented by the formula (1), derivatives of bicycloheptene in which x is 0, derivatives of tetracyclododecene in which x is 1, derivatives of hexacycloheptadecene in which x is 2 and derivatives of octacyclodocosene in which x is 3 are illustrated. Substituents $R^1$, $R^2$, $R^3$ and $R^4$ may be the same or different from each other.

Each of the substituents is selected from the following members.

(1) Hydrogen atom (2) Alkyl groups having 1 to 12 carbon atoms such as methyl, ethyl, propyl, isopropyl, butyl, t-butyl and cyclohexyl (3) Aryl groups such as phenyl and naphthyl (4) Aralkyl groups such as benzyl, phenethyl, phenylisopropyl, 2-naphthylmethyl, 2-naphthylethyl and 2-naphthylisopropyl (5) Alkoxy groups such as methoxy, ethoxy and menthoxy (6) Halogen atoms such as chlorine, bromine, iodine and fluorine (7) Halogenated alkyl groups having 1 to 12 carbon atoms such as fluoromethyl, chloromethyl, bromomethyl, difluoromethyl, dichloromethyl, dibromomethyl, trifluoromethyl, trichloromethyl and tribromomethyl (8) Cyano group (9) Carboxyl group

(10) Alkoxycarbonyl groups such as methoxycarbonyl, ethoxycarbonyl and menthoxycarbonyl.

Especially when at least one of the substituents is nitryl group, the monomer is preferred.

The examples are illustrated below.

(1) Cyanobicyclohept-enes such as 5-cyanobicyclo[2.2.1]hept-2-ene, 5-cyano--5methylbicyclo[2.2.1]hept-2-ene, 5-dicyanobicyclo[2.2.1]hept-2-ene, 5-cyano-6-methylbicyclo[2.2.1]hept-2-ene, 5-cyano-6-methoxybicyclo[2.2.1]hept-2-ene, 5-cyano-6-carboxymethylbicyclo[2.2.1]hept-2-ene, 5-cyano-6-carboxybicyclo[2.2.1]hept-2-ene, 5-cyano-6cyanobicyclo[2.2.1]hept-2-ene, 5-cyano-6-trifluoromethylbicyclo[2.2.1]hept-2-ene, 5-cyano-6-fluorobicyclo[2.2.1]hept-2-ene, 5-cyano-6-difluorobicyclo[2.2.1]hept-2-ene, 5-cyano-6-phenylbicyclo[2.2.1]hept-2-ene, 5-cyano-6-benzylbicyclo[2.2.1]hept-2-ene and 5-cyano-6-cyclohexylbicyclo[2.2.1]hept-2-ene (2) Cyanotetracyclododecenes such as 8-cyanotetracyclo[4.4.0.1$^{2,5}$.1$^{7,10}$]-3-dodecene, 8-cyano-8-methyltetracyclo[4.4.0.1$^{2,5}$.1$^{7,10}$]-3-dodecene, 8-dicyanotetracyclo[4.4.0.1$^{2,}$$_{5}$.1$^{7,10}$]-3-dodecene, 8-cyano-9-methyltetracyclo[4.4.0.1$^{2,}$$_{5}$.1$^{7,10}$]-3-dodecene, 8-cyano-9-methoxytetracyclo[4.4.0.1$^{2,}$$_{5}$.1$^{7,10}$]-3-dodecene, 8-cyano-9-carboxymethyltetracyclo[4.4.0.1$^{2,5}$.1$^{7,10}$]-3-dodecene, 8-cyano-9-carboxytetracyclo[4.4.0.1$^{2,5}$.1$^{7,10}$]-3-dodecene, 8-cyano-9-cyanotetracyclo[4.4.0.1$^{2,5}$.1$^{7,10}$]-3-dodecene, 8-cyano-9-trifluoromethyltetracyclo[4.4.0. 1$^{2,5}$.1$^{7,10}$]-3-dodecene, 8-cyano-9-fluorotetracyclo[4.4.0. 1$^{2,5}$.1$^{7,10}$]-3-dodecene, 8-cyano-9-difluorotetracyclo[4.4.0. 1$^{2,5}$.1$^{7,10}$]-3-dodecene, 8-cyano-9-phenyltetracyclo[4.4.0. 1$^{2,5}$.1$^{7,10}$]-3-dodecene, 8-cyano-9-benzyltetracyclo[4.4.0. 1$^{2,5}$.1$^{7,10}$]-3-dodecene and 8-cyano-9-cyclohexyltetracyclo[4.4.0.1$^{2,5}$.1$^{7,10}$]-3-dodecene (3) Cyanohexacycloheptadecenes such as 11-cyanohexacyclo[6.6.1.1$^{3,6}$.1$^{10,13}$.0$^{2,7}$.0$^{9,14}$]-4-heptadecene, 11-cyano-11-methylcyclo[6.6.1.1$^{3,6}$.1$^{10,13}$.0$^{2,}$$_{7}$.0$^{9,14}$]-4-heptadecene, 11-dicyanohexacyclo[6.6.1.1$^{3,6}$.1$^{10,}$$_{13}$.0$^{2,7}$.0$^{9,14}$]-4-heptadecene, 11-cyano-12-methylhexacyclo[6.6.1.1$^{3,6}$.1$^{10,13}$.0$^{2,7}$.0$^{9,14}$]-4-heptadecene, 11-cyano-12-methoxyhexacyclo[6.6.1.1$^{3,6}$.1$^{10,13}$.0$^{2,7}$.0$^{9,14}$]-4-heptadecene, 11-cyano-12-carboxymetylhexacyclo[6.6.1.1$^{3,}$$_{6}$.1$^{10,13}$.0$^{2,7}$.0$^{9,14}$]-4-heptadecene, 11-cyano-12-carboxyhexacyclo[6.6.1.1$^{3,6}$.1$^{10,13}$.0$^{2,7}$.0$^{9,14}$]-4-heptadecene, 11-cyano-12-cyanohexacyclo[6.6.1.1$^{3,6}$.1$^{10,}$$_{13}$.0$^{9,14}$]-4-heptadecene, 11-cyano-12-trifluoromethylhexacyclo[6.6.1.1$^{3,6}$.1$^{10,13}$.0$^{2,7}$.0$^{9,14}$]-4-heptadecene, 11-cyano-12-fluorohexacyclo[6.6.1.1$^{3,6}$.1$^{10,}$$_{13}$.0$^{2,7}$.0$^{9,14}$]-4-heptadecene, 11-cyano-12-difluorohexacyclo[6.6.1.1$^{3,6}$.1$^{10,13}$.0$^{2,7}$.0$^{9,14}$]-4-heptadecene, 11-cyano-12-phenylhexacyclo[6.6.1.1$^{3,6}$.1$^{10,}$$_{13}$.0$^{2,7}$.0$^{9,14}$]-4-heptadecene, 11-cyano-12-benzylhexacyclo[6.6.1.1$^{3,6}$.1$^{10,13}$.0$^{2,7}$.0$^{9,14}$]-4-heptadecene and 11-cyano-12-cyclohexylhexacyclo[6.6.1.1$^{3,6}$.1$^{10,13}$.0$^{2,7}$.0$^{9,14}$]-4-heptadecene (4) Cyanooctacyclodocosenes such as 14-cyanooctacyclo[8.8.0.1$^{2,9}$.1$^{4,7}$.1$^{11,18}$.1$^{13,16}$.0$^{3,8}$.0$^{12,17}$]-5-docosene, 14-cyano-14-methyloctacyclo[8.8.0.1$^{2,9}$.1$^{4,7}$.1$^{11,18}$.1$^{13,}$$_{16}$.0$^{3,8}$.0$^{12,17}$]-5-docosene, 14-dicyanooctacyclo[8.8.0.1$^{2,}$$_{9}$.1$^{4,7}$.1$^{11,18}$.1$^{13,16}$.0$^{3,8}$.0$^{12,17}$]-5-docosene, 14-cyano-15-methyloctacyclo[8.8.0.1$^{2,9}$.1$^{4,7}$.1$^{11,18}$.1$^{13,16}$.0$^{3,8}$.0$^{12,17}$]-5-docosene, 14-cyano-15-methoxyoctacyclo[8.8.0.1$^{2,9}$.1$^{4,}$$_{7}$.1$^{11,18}$.1$^{13,16}$.0$^{3,8}$.0$^{12,17}$]-5-docosene, 14-cyano-15-carboxymethyloctacyclo[8.8.0.1$^{2,9}$.1$^{4,7}$.1$^{11,18}$.1$^{13,16}$.0$^{3,}$$_{8}$.0$^{12,17}$]-5-docosene, 14-cyano-15-carboxyoctacyclo[8.8.0.1$^{2,9}$.1$^{4,7}$.1$^{11,18}$.1$^{13,16}$.0$^{3,8}$.0$^{12,17}$]-5-docosene, 14-cyano-15-cyanooctacyclo[8.8.0.1$^{2,9}$.1$^{4,7}$.1$^{11,18}$.1$^{13,16}$.0$^{3,}$$_{8}$.0$^{12,17}$]-5-docosene, 14-cyano-15-trifluoromethyloctacyclo[8.8.0.1$^{2,9}$.1$^{4,7}$.1$^{11,18}$.1$^{13,16}$.0$^{3,8}$.0$^{12,17}$]-5-docosene, 14-cyano-15-fluorooctacyclo[8.8.0.1$^{2,9}$.1$^{4,7}$.1$^{11,18}$.1$^{13,16}$.0$^{3,}$$_{8}$.0$^{12,17}$]-5-docosene, 14-cyano-15-difluorooctacyclo[8.8.0.1$^{2,9}$.1$^{4,7}$.1$^{11,18}$.1$^{13,16}$.0$^{3,8}$.0$^{12,17}$]-5-docosene, 14cyano-15-phenyloctacyclo[8.8.0.1$^{2,9}$.1$^{4,7}$.1$^{11,18}$.1$^{13,16}$.0$^{3,}$$_{8}$.0$^{12,17}$]-5-docosene, 14-cyano-15-benzyloctacyclo[8.8.0.1$^{2,9}$.1$^{4,7}$.1$^{11,18}$.1$^{13,16}$.0$^{3,8}$.0$^{12,17}$]-5-docosene and 14-cyano-15-cyclohexyloctacyclo[8.8.0.1$^{2,9}$.1$^{4,7}$.1$^{11,18}$.1$^{13,}$$_{16}$.0$^{3,8}$.0$^{12,17}$]-5-docosene The examples are further illustrated below.

(5) Bicyclohept-ene derivatives such as bicyclo[2.2.1]hept-2-ene, 5-metylbicyclo[2.2.1]hept-2-ene, 5-ethylbicyclo[2.2.1]hept-2-ene, 5-carboxybicyclo[2.2.1]hept-2-ene, 5-carboxymethylbicyclo[2.2.1]hept-2-ene, 5-benzylbicyclo[2.2.1]hept-2-ene, 5-chlorobicyclo[2.2.1]hept-2-ene, 5-bromobicyclo[2.2.1]hept-2-ene, 5-methoxybicyclo[2.2.1]hept-2-ene, 5-ethoxybicyclo[2.2.1]hept-2-ene and 5-methyl-6-methylbicyclo[2.2.]hept-2-ene (6) Tetracyclododecene derivatives such as tetracyclo[4.4.0.1$^{2,5}$.1$^{7,10}$]-3-dodecene, 8-methyltetracyclo[4.4.0.1$^{2,}$$_{5}$.1$^{7,10}$]-3-dodecene, 8-ethyltetracyclo[4.4.0.1$^{2,5}$.1$^{7,10}$]-3-dodecene 8-carboxytetracyclo[4.4.0.1$^{2,5}$.1$^{7,10}$]-3-dodecene, 8-carboxymethyltetracyclo[4.4.0.1$^{2,5}$.1$^{7,10}$]-3-dodecene, 8-benzyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene, 8-methoxytetracyclo[4.4.0.1$^{2,5}$.1$^{7,10}$]-3-dodecene, 8-ethoxytetracyclo[4.4.0.1$^{2,5}$.1$^{7,10}$]-3-dodecene, 8-methyl-9-methyltetracyclo[4.4.0.1$^{2,5}$.1$^{7,10}$]-3-dodecene, 8-methyl-9-carboxymethyltetracyclo[4.4.0.1$^{2,5}$.1$^{7,10}$]-3-dodecene and 8-phenyltetracyclo[4.4.0.1$^{2,5}$.1$^{7,10}$]-3-dodecene (7) Hexacycloheptadecene derivatives such as hexacyclo[6.6.1.1$^{3,6}$.0$^{2,7}$.0$^{9,14}$]-4-heptadecene, 11-methylhexacyclo[6.6.1.1$^{3,6}$.0$^{2,7}$.0$^{9,14}$]-4-heptadecene, 11-ethylhexacyclo[6.6.1.1$^{3,6}$.0$^{2,7}$.0$^{9,14}$]-4-heptadecene, 11-carboxyhexacyclo[6.6.1.1$^{3,6}$.0$^{2,7}$.0$^{9,14}$]-4-heptadecene, 11-benzylhexacyclo[6.6.1.1$^{3,6}$.0$^{2,7}$.0$^{9,14}$]-4-heptadecene, 11-carboxyhexacyclo[6.6.1.1$^{3,6}$.0$^{2,7}$.0$^{9,14}$]-4-heptadecene, 11-methoxyhexacyclo[6.6.1.1$^{3,6}$.0$^{2,7}$.0$^{9,14}$]-4-heptadecene, 11-ethoxyhexacyclo[6.6.1.1$^{3,6}$.0$^{2,7}$.0$^{9,14}$]-4-heptadecene and 11-methyl-12-carboxymethylhexacyclo[6.6.1.1$^{3,6}$.0$^{2,7}$.0$^{9,14}$]-4-heptadecene (8) Octacyclodocosene derivatives such as octacyclo[8.8.0.1$^{2,9}$.1$^{4,7}$.1$^{11,18}$.1$^{13,16}$.0$^{3,8}$.0$^{12,17}$]-5-docosene, 14-methyloctacyclo[8.8.0.1$^{2,9}$.1$^{4,7}$.1$^{11,18}$.1$^{13,16}$.0$^{3,8}$.0$^{12,17}$]-5-docosene, 14-ethyloctacyclo[8.8.0.1$^{2,9}$.1$^{4,7}$.1$^{11,18}$.1$^{13,}$$_{16}$.0$^{3,8}$.0$^{12,17}$]-5-docosene, 14-carboxyoctacyclo[8.8.0.1$^{2,}$ 9.1$^{4,7}$.1$^{11,18}$.1$^{13,16}$.0$^{3,8}$.0$^{12,17}$]-5-docosene, 14-benzyloctacyclo[8.8.0.1$^{2,9}$.1$^{4,7}$.1$^{11,18}$.1$^{13,16}$.0$^{3,8}$.0$^{12,17}$]-5-docosene, 14-carboxymethyloctacyclo[8.8.0.1$^{2,9}$.1$^{4,7}$.1$^{11,18}$.1$^{13,16}$.0$^{3,8}$.0$^{12,17}$]-5-docosene, 14-methoxyoctacyclo [8.8.0.1$^{2,9}$.1$^{4,7}$.1$^{11,18}$.1$^{13,16}$.0$^{3,8}$.0$^{12,17}$]-5-docosene, 14-ethoxyoctacyclo[8.8.0.1$^{2,9}$.1$^{4,7}$.1$^{11,18}$.1$^{13,16}$.0$^{3,8}$.0$^{12,17}$]-5-docosene and 14-methyl-15-carboxymethyloctacyclo [8.8.0.1$^{2,9}$.1$^{4,7}$.1$^{11,18}$.1$^{13,16}$.0$^{3,8}$.0$^{12,17}$]-5-docosene Illustrated monocyclic olefins include cycloolefins such as cyclobutene, cyclopentene, cycloheptene and cyclooctene, and further dimers of cyclopentadiene. Especially when a monomer containing nitryl groups is ring-opening metathesis polymerized, the resulting polymer has better and preferred properties.

These cyclic olefin monomers are not always used alone and may be used in combination in optional ratios to carry out ring-opening polymerization.

Any types of polymerization catalysts may be used in the present invention if they perform ring-opening polymerization. The examples of ring-opening metathesis catalyst are illustrated below.

(1) Tungsten alkylidene catalysts such as W(N-2,6-C$_6$H$_3$ Pr$^i_2$)(CtBu') (OBu')$_2$, W(N-2,6-C$_6$H$_3$ Pr$^i_2$)(CHBu') (OCMe$_2$CF$_3$)$_2$, W(N-2,6-C$_6$H$_3$Pr$^i_2$)(CHBu') (OCMe$_2$(CF$_3$)$_2$)$_2$, W(N-2,6-C$_6$H$_3$Pr$^i_2$) (CHCMe$_2$Ph) (OBu')$_2$ W(N-2,6-C$_6$H$_3$Pr$^i_2$) (CHCMe$_2$Ph) (OCMe$_2$CF$_3$)$_2$ and W(N-2,6-C$_6$H$_3$ Pr$^i_2$)(CHCMe$_2$Ph) (OCMe$_2$(CF$_3$)$_2$)$_2$ wherein Pr$^i$ stands for isopropyl group, Bu$^t$ stands for tert-butyl group, Me stands for methyl group and Ph stands for phenyl group (2) Other tungsten alkylidene catalysts such as W(N-2,6-Me$_2$ C$_6$H$_3$)(CHCHCMePh) (O-Bu')$_2$(PMe$_3$), W(N-2,6-Me$_2$ C$_6$H$_3$)(CHCHCMe$_2$)(O-Bu')$_2$(PMe$_3$), W(N-2,6-Me$_2$ C$_6$H$_3$) (CHCHCPh$_2$)(O-Bu')$_2$(PMe$_3$), W(N-2,6-Me$_2$ C$_6$H$_3$) (CHCHCMePh) (OCMe$_2$(CF$_3$))$_2$(PMe$_3$), W(N-2,6-Me$_2$ C$_6$H$_3$) (CHCHCMe$_2$)(OCMe$_2$(CF$_3$))$_2$(PMe$_3$), W(N-2,6-Me$_2$ C$_6$H$_3$) (CHCHCPh$_2$) (OCMe$_2$(CF$_3$)$_2$)$_2$(PMe$_3$), W(N-2,6-Me$_2$ C$_6$H$_3$) (CHCHCMe$_2$)(OCMe(CF$_3$)$_2$)$_2$(PMe$_3$), W(N-2,6-Me$_2$ C$_6$H$_3$)(CHCHCMe$_2$) (OCMe(CF$_3$)$_2$)$_2$(PMe$_3$), W(N-2,6-Me$_2$ C$_6$H$_3$)(CHCHCPh$_2$)(OCMe(CF$_3$)$_2$)$_2$(PMe$_3$), W(N-2,6-Pr$^i_2$ C$_6$H$_3$)(CHCHCMePh)(OCMe$_2$(CF$_3$))$_2$(PMe$_3$), W(N-2,6-Pr$^i_2$ C$_6$H$_3$)(CHCHCMePh) (OCMe(CF$_3$)$_2$)$_2$ (PMe$_3$) and W(N-2,6-Pr$^i_2$ C$_6$H$_3$)(CHCHCMePh)(OPh)$_2$ (PMe$_3$) wherein Pr$^i$ stands for isopropyl group, Bu$^t$ stands for tert-butyl group, Me stands for methyl group and Ph stands for phenyl group (3) Molybdenum alkylidene catalysts such as Mo(N-2,6-Pr$^i_2$C$_6$H$_3$)(CH Bu')(OBu')$_2$ Mo(N-2,6-Pr$^i_2$C$_6$H$_3$) (CH Bu') (OCMe$_2$CF$_3$)$_2$, Mo(N-2,6-Pr$^i_2$C$_6$H$_3$)(CH Bu')(OCMe(CF$_3$)$_2$)$_2$, Mo(N-2,6-Pr$^i_2$C$_6$H$_3$) (CHCMe$_2$Ph) (CHBU')$_2$, Mo(N-2,6-Pr$^i_2$C$_6$H$_3$) (CHCMe$_2$Ph) (OCMe$_2$CF$_3$)$_2$ and Mo(N-2,6-Pr$^i_2$C$_6$H$_3$) (CHCMe$_2$Ph) (OCMe(CF$_3$)$_2$)$_2$(CF$_3$)$_2$)$_2$wherein Pr$^i$ stands for isopropyl group, Bu$^t$ stands for tert-butyl group, Me stands for methyl group and Ph stands for phenyl group (4) Rhenium alkylidene catalysts such as Re(CBu') (CHBu')(O-2,6-Pr$^i_2$ C$_6$H$_3$)$_2$, Re(CBu')(CHBu')(O-2-Bu$^t$C$_6$H$_4$)$_2$, Re(CBu')(CHBu')(OCMe$_2$CF$_3$)$_2$, Re(CBu') (CHBu')(OCMe(CF$_3$)$_2$)$_2$ and Re(CBu')(CHBU')(O-2,6-Me C$_6$H$_3$)$_2$ wherein Bu$^t$ stands for tert-butyl group (5) Tantalum alkylidene catalysts such as Ta[C(Me)C (Me)CHMe$_3$](O-2,6-Pr$^i_2$C$_6$H$_3$)$_3$Py and Ta[C(Ph)C(Ph) CHMe$_3$](O-2,6-Pr$^i_2$C$_6$H$_3$)$_3$Py wherein Me stands for methyl group, Ph stands for phenyl group and Py stands for pyridyl group (6) Ruthenium alkylidene catalysts such as Ru(CHCHCP$_2$) (PPh$_3$)$_2$Cl$_2$ wherein Ph stands for phenyl group and (7) titanocyclobutanes The above-mentioned catalysts may be used alone or in combination.

Furthermore, as described in "Olefin Metathesis" (Kenneth J Ivin, Academic Press, New York 1983), other ring-opening metathesis catalysts where a transition metal compound and a Lewis acid that is a promoter are in combination can also be used. For example, the ring-opening metathesis catalysts consist of a halide of a transition metal such as molybdenum, tungsten, vanadium or titanium and, as a promoter, an organic aluminum compound, an organic tin compound or an organometallic compound containing a metal such as lithium, sodium, magnesium, zinc, cadmium or boron.

The transition metal halides are illustrated below. (1) Molybdenum halides such as $MoBr_2$, $MoBr_3$, $MoBr_4$, $MoCl_4$, $MoCl_5$, $MoF_4$, $MoOCl_4$ and $MoOF_4$ (2) Tungsten halides such as $WBr_2$, $WBr_4$, $WCl_2$, $WCl_4$, $WCl_5$, $WCl_6$, $WF_4$, $WI_2$, $WOBr_4$, $WOCl_4$, $WOF_4$, $WCl_4(OC_6H_4Cl_2)_2$ (3) Vanadium halides such as $VOCl_3$ and $VOBr_3$ (4) Titanium halides such as $TiCl_4$ and $TiBr_4$ The organometallic compounds as the promoters are illustrated below.

(1) Organic aluminium compounds such as Trimethylaluminium, triethylaluminium, triisobutylaluminium, trihexylaluminium, trioctylaluminium, triphenylaluminium, tribenzylaluminium, diethylaluminiummonochloride, di-n-butylaluminiummonochloride, diethylaluminiummonobromide, diethylaluminiummonoiodide, diethylaluminiummonohydride, ethylaluminiumsesquichloride and ethylaluminiumdichloride (2) Organic tin compounds such as tetramethyltin, diethyldimethyltin, tetraethyltin, dibutyldiethyltin, tetrabutyltin, tetraoctyltin, trioctyltinfluoride, trioctyltinchloride, trioctyltinbromide, trioctyltiniodide, dibutyltindifluoride, dibutyltindichloride, dibutyltindibromide, dibutyltindiiodide, butyltintrifluoride, butyltintrichloride, butyltintribromide and butyltintriiodide (3) Organic lithium compounds as n-butyllithium (4) Organic sodium compounds such as n-pentylsodium (5) Organic magnesium compounds such as metylmagnesiumiodide, ethylmagnesiumbromide, methylmagnesiumbromide, n-propylmaganesiumbromide, t-butylmagnesiumchloride and arylmagnesiumchloride (6) Organic lead compounds such as diethyllead (7) Organic cadmium compounds such as diethylcadmium (8) Organic boron compounds such as trimethylboron, triethylboron and tri-n-butylboron The molar ratio of the ring-opening metathesis catalyst to the cyclic olefin monomer is in the range of 0.01:100 to 10:100 when the catalyst is one member selected from the group consisting of alkylidene catalysts of tungsten, molybdenum, rhenium, tantalum or ruthenium and titanocyclobutanes. Preferably the ratio is 0.1:100 to 5:100. The molar ratio of the transition metal halides in the ring-opening metathesis catalyst to the cyclic olefin monomer is in the range of 0.001:100 to 5:100 when the catalyst is composed of the transition metal halide and the organometallic compound. Preferably the ratio is 0.01:100 to 3:100. The molar ratio of the organometallic compound as the promoter to the cyclic olefin monomer is 0.005:100 to 10:100 and preferably 0.02:100 to 5:100.

As the solvents used in the ring-opening metathesis polymerization, ethers such as tetrahydrofuran, diethyl ether, dibutyl ether and dimethoxyethane, aromatic compounds such as benzene, toluene, xylene and ethylbenzene, aliphatic hydrocarbons such as cyclopentane, cyclohexane, methylcyclohexane, dimethylcyclohexane and Decalin are illustrated. Halogenated hydrocarbons such as methylene dichloride, dichloroethane, dichloroethylene, tetrachloroethane, chlorobenzene and trichlorobenzene are also illustrated as the solvents. These solvents may be used in combination.

Furthermore, to regulate the molecular weight, the ring-opening metathesis polymerization may be carried out in the presence of an olefin compound such as ethylene, propylene, 1-butene, isobutene, styrene, 1-hexene, 4-methylpentene and hexadiene.

In the ring-opening metathesis polymerization, the concentration of the monomer and the ring-opening metathesis catalyst in the polymerization solvent depends on the reactivity of the monomer and the solubility of the monomer to the polymerization solvent. Preferably the concentration is in the range of 0.1 to 100 moles/L. Usually the reaction temperature is in the range of −30 to 150° C. and the reaction time is in the range of 1 minute to 10 hours. The reaction is stopped using a deactivation agent selected from the group consisting of aldehydes, ketones and alcohols to obtain a ring-opening metathesis polymer solution.

In the hydrogenation reaction of a ring-opening metathesis polymer of a cyclic olefin monomer of the present invention, it is possible to increase its hydrogenation rate by hydrogenating in the presence of hydrogen using a hydrogenation catalyst consisting of an organometallic complex and an amine compound.

M in the organometallic complex represented by the general formula (2) of the present invention stands for ruthenium, rhodium, osmium, iridium, palladium, platinum or nickel atom and H stands for hydrogen atom. Q stands for a halogen atom and chlorine, fluorine, bromine and iodine are illustrated. T stands for CO, NO, toluene, acetonitrile or tetrahydrofuran. Z stands for an organic phosphorous compound and trimethylphosphine, triethylphosphine, triisopropylphosphine, tri-n-propylphosphine, tri-n-butylphosphine, triisobutylphosphine, tri-n-butylphosphine, tricyclohexylphosphine, triphenylphosphine, methyldiphenylphosphine, dimethylphenylphosphine, tri-o-tolylphosphine, tri-m-tolylphosphine, tri-p-tolylphosphine, diethylphenylphosphine, dichloro(ethyl)phosphine, dichloro(phenyl)phosphine, chlorodiphenylphosphine, trimethylphosphite, triisopropylphosphite and triphenylphosphite are illustrated.

Illustrated organometallic complexes represented by the general formula (2) include dichlorobis(triphenylphosphine) nickel, dichlorobis(triphenylphosphine)palladium, dichlorobis(triphenylphosphine)platinum, chlorotris(triphenylphosphine)rhodium, dichlorotris(triphenylphosphine)osmium, dichlorohydridobis(triphenylphosphine)iridium, dichlorotris(triphenylphosphine)ruthenium, dichlorotetrakis(triphenylphosphine)ruthenium, trichloronitrosylbis(triphenylphosphine)ruthenium, dichlorobis(acetonitrile)bis(triphenylphosphine)ruthenium dichlorobis(tetrahydrofuran)bis(triphenylphosphine)ruthenium, chlorohydrido(toluene)tris(triphenylphosphine)ruthenium, chlorohydridocarbonyltris(triphenylphosphine)ruthenium, chlorohydridocarbonyltris(diethylphenylphosphine) ruthenium chlorohydridonitrosyltris(triphenylphosphine) ruthenium, dichlorotris(trimethylphosphine)ruthenium, dichcorotris(triethylphosphine)ruthenium, dichlorotris(tricyclohexylphosphine)ruthenium, dichorotris(triphenylphosphine)ruthenium, dichlorotris(trimethyldiphenylphosphine)ruthenium, dichlorotris(tridimethylphenylphosphine)ruthenium, dichlorotris(tri-o-tolylphosphine)ruthenium, dichlorotris(dichloroethylphosphine)ruthenium, dichlorotris(dichlorophenylphosphine)ruthenium, dichiorotris(trimethylphosphite)ruthenium and dichlorotris(triphenylphosphite)ruthenium.

Illustrated amine compounds include primary amine compounds such as methylamine, ethylamine, aniline, ethylenediamine and 1,3-diaminocyclobutane; secondary amine compounds such as dimethylamine, methylisopropylamine and N-methylaniline; and tertiary amine compounds such as trimethylamine, triethylamine, triphenylamine, N,N-dimethylaniline, pyridine and γ-picoline. The hydrogenation rate increases especially when triethylamine is used.

These organometallic complexes and amine compounds can individually be used in combination of at least two in optional ratios.

The ratio of the organometallic complex to the ring-opening metathesis polymer of the cyclic olefin monomer is in the range of 5 to 50,000 ppm (weight), preferably 10 to 10,000 ppm (weight), especially preferably 50 to 1,000 ppm (weight). The ratio of the amine compound to the organometallic complex is in the range of 0.1 to 1,000 (equivalent weight), preferably 0.5 to 500 (equivalent weight) and especially preferably 1 to 100 (equivalent weight).

As a hydrogenation catalyst consisting of an organometallic complex and an amine compound used in the present invention, an organometallic complex and an amine compound contact in advance and the resulting catalyst can be used. However, it is possible to directly add an organometallic complex and an amine compound into the reaction system without contacting them in advance.

Any type of solvent may be used as the solvent used in the hydrogenation reaction of a ring-opening metathesis polymer if the solvent itself can neither dissolve the polymer nor be hydrogenated. Ethers such as tetrahydrofuran, diethyl ether, dibutyl ether and dimethoxyethane, aromatic hydrocarbons such as benzene, toluene, xylene and ethylbenzene, aliphatic hydrocarbons such as pentane, hexane and heptane are illustrated as the solvent. Aliphatic cyclic hydrocarbons such as cyclopentane, cyclohexane, methylcyclohexane, dimethylcyclohexane and Decalin, and halogenated hydrocarbons such as methylene dichloride, dichloroethane, dichloroethylene, tetrachloroethane, chlorobenzene and trichlorobenzene are also illustrated as the solvent. These solvents may be used in combination of at least two.

The hydrogenation reaction of the ring-opening metathesis polymer is usually carried out at a pressure of 1.0 Mpa (atmospheric pressure) to 29.5 Mpa (300 kg/cm$^2$G; hydrogen pressure), preferably 0.6 to 19.7 Mpa (5 to 200 kg/cm$^2$G; hydrogen pressure), especially preferably 2.1 to 14.8 Mpa (20 to 150 kg/cm$^2$G; hydrogen pressure). The reaction temperature is usually in the range of 0 to 300° C., preferably room temperature to 250° C., especially 50 to 200° C.

It is also possible to produce a hydrogenated product of a cyclic olefin metathesis polymer even if the ring-opening metathesis polymer is isolated from the solution of the ring-opening metathesis polymer and dissolved in a solvent again. It is also possible to adopt a method in which the hydrogenation catalyst consisting of the organometallic complex and the amine compound is added to the solution of the ring-opening metathesis polymer without any isolation.

It is possible to remove a ring-opening metathesis catalyst or hydrogenation catalyst remaining in a polymer according to a well-known method after completion of the ring-opening metathesis polymerization or hydrogenation reaction. The method is, for example, illustrated as follows. (1) In an adsorption method, an adsorbent is used. (2) In an extraction and removal method, an organic acid such as lactic acid, a poor solvent and water are added into a solution containing of a good solvent and the mixture is extracted and removed at room temperature or high temperature. (3) In a contact method, a solution or a polymer slurry containing a good solvent is mixed with a basic or acidic compound and then washing and removal are carried out.

The method in which a hydrogenated product is recovered from a solution of the hydrogenated product of a ring-opening metathesis polymer is not particularly limited and may be a well-known method. The method is, for example, illustrated as follows. (1) A reaction mixture is charged into a poor solvent under stirring to solidify the hydrogenated product of a polymer and the product is recovered through filtration, centrifugation and decantation. (2) Steam is charged into a reaction mixture to crystallize the hydrogenated product of a polymer in a steam stripping method. (3) A solvent is directly removed from a reaction mixture under heating.

According to the hydrogenation method of the present invention, it is easy to achieve a hydrogenation rate of 90% or more. It is possible to achieve 95% or more, especially 99% or more. The resulting hydrogenated product of the cyclic olefin metathesis polymer cannot be oxidized easily and becomes an excellent hydrogenated product of the cyclic olefin ring-opening metathesis polymer.

EXAMPLES

The present invention will be explained in more detail by way of examples. However, the scope of the present invention is not limited by these examples.

The physical properties of the polymer obtained in the examples were determined according to the following methods.

Average Molecular Weight: GPC was used. The resulting cyclic olefin ring-opening metathesis polymer or hydrogenated product of the polymer was dissolved in chloroform. As the detector, 830-RI and UVIDEC-100-VI (Nihon Bunko Co.) were used. As the columns, Shodex k-805, 804, 803 and 802.5 were used. The molecular weight was calibrated using the polyethylene standard at a flow rate of 1.0 ml/min. at room temperature.

Glass Transition Temperature: DSC-50 (Shimadzu Seisakusho Co.) was used. The temperature was measured in nitrogen flow at an increasing rate of temperature of 10° C./min. The sample powders of the cyclic olefin ring-opening metathesis polymer and hydrogenated product of the polymer were each 3.5 mg.

Hydrogenation Rate: The sample powder of the hydrogenated product of the cyclic olefin ring-opening metathesis polymer was dissolved in chloroform deuteride. The peaks resulting from the carbon-carbon double bond in the main chain ($\delta$=4.5–6.0 ppm, 90 MHz-NMR) were measured. The decrease due to the hydrogenation was calculated.

Example 1

In a 500-ml flask with a magnetic stirring device under nitrogen atmosphere was dissolved 8-cyanotetracyclo[4.4.0.1$^{2,5}$.1$^{7,10}$]-3-dodecene (10.00 g, 54.20 mmoles) in tetrahydrofuran (400 ml). Stirring was carried out. To the solution was added Mo(N-2,6C$_6$H$_3$Pr$^i_2$)(CHCMe$_2$Ph)(OBu$^t$)$_2$ (300 mg, 0.540 mmole) as the ring-opening metathesis polymerization catalyst. Reaction was carried out for one hour at room temperature. Then, benzaldehyde (252 mg, 2.700 mmoles) was added. Stirring was carried out for additional 30 minutes and the reaction was stopped.

To the ring-opening metathesis polymer solution was added trimethylenediamine (400 mg, 5.40 mmoles) and stirring was carried out for 30 minutes at room temperature. The resulting mixture was added into methanol (2,000 ml) to precipitate the ring-opening metathesis polymer. The polymer was removed by filtration and was dissolved in tetrahydrofuran (300 ml) again. Citric acid (1.033 g, 5.40 mmoles) was added to the solution. The solution was stirred for 30 minutes at room temperature and added into methanol (1,500 ml) and then washed. The washed polymer was dried in vacuo to obtain 10.00 g of the ring-opening metathesis polymer powder.

Then, 10.00 g of the ring-opening metathesis polymer powder were dissolved in tetrahydrofuran (800ml) in a 5,000 ml autoclave. To the solution was added a tetrahydrofuran (80 ml) solution containing dichlorotetrakis(triphenylphosphine) ruthenium (5.0 mg, 0.004 mmole) and triethylamine (2.1 mg, 0.020 mmole) that had been prepared as the hydrogenation catalyst. Hydrogenation was carried out at a hydrogen pressure of 8.4 Mpa (85 kg/cm$^2$G) at 165° C. for five hours. The temperature was cooled down to room temperature and hydrogen gas was released.

The solution containing the hydrogenated product of the ring-opening metathesis polymer was concentrated until the volume was reduced to half. The concentrate was added into a mixed solution consisting of acetone (800 ml) and methanol (1,200 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,300 and the number average molecular weight Mn was 18,260. Mw/Mn was 1.00. According to the DSC, the glass transition temperature was 207° C.

Example 2

Ring-opening metathesis polymerization was carried out as in EXAMPLE 1 to obtain a predetermined amount of the ring-opening metathesis polymer powder. Then, 10.00 g of the ring-opening metathesis polymer powder were dissolved in tetrahydrofuran (800 ml) in a 5,000-ml autoclave. To the solution was added a tetrahydrofuran (80 ml) solution containing dichlorotris(triphenylphosphine)ruthenium (5.0 mg, 0.005 mmole) and triethylamine (3.0 mg, 0.026 mmole) that had been prepared as the hydrogenation catalyst. Hydrogenation was carried out at a hydrogen pressure of 8.4 Mpa (85 kg/cm$^2$G) at 165° C. for five hours. The temperature was cooled down to room temperature and hydrogen gas was released.

The solution containing the hydrogenated product of the ring-opening metathesis polymer was concentrated until the volume was reduced to half. The concentrate was added into a mixed solution consisting of acetone (800 ml) and methanol (1,200 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the obtained ring-opening metathesis polymer. The hydrogenation rate was 100% because the peaks resulting from the olefinic protons in the main chain were not observed. According to the GPC, the weight average molecular weight Mw was 18,350 and the number average molecular weight Mn was 18,310. Mw/Mn was 1.00. According to the DSC, the glass transition temperature was 207° C.

Example 3

Ring-opening metathesis polymerization was carried out as in EXAMPLE 1 to obtain a solution of the ring-opening metathesis polymer. To the solution was added a tetrahydrofuran (80 ml) solution containing dichlorotetrakis (triphenylphosphine)ruthenium (5.0 mg, 0.004 mmole) and triethylamine (2.1 mg, 0.020 mmole) as the hydrogenation catalyst. Hydrogenation was carried out at a hydrogen pressure of 8.4 Mpa (85 kg/cm$^2$G) at 165° C. for five hours. The temperature was cooled down to room temperature and hydrogen gas was released.

The solution containing the hydrogenated product of the ring-opening metathesis polymer was concentrated until the volume was reduced to half. The concentrate was added into a mixed solution consisting of acetone (800 ml) and methanol (1,200 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,190 and the number average molecular weight Mn was 18,310. Mw/Mn was 1.00. According to the DSC, the glass transition temperature was 207° C.

Example 4

Ring-opening metathesis polymerization was carried out as in EXAMPLE 1 to obtain a predetermined amount of the ring-opening metathesis polymer powder. Then, 10.00 g of the ring-opening metathesis polymer powder were dissolved in tetrahydrofuran (840 ml) in a 5,000 -ml autoclave. To the solution was added a tetrahydrofuran (40 ml) solution containing dichlorotetrakis(triphenylphosphine)ruthenium (5.0 mg, 0.004 mmole) and triethylamine (2.1 mg, 0.020 mmole) as the hydrogenation catalyst. Hydrogenation was carried out at a hydrogen pressure of 8.4 Mpa (85 kg/cm$^2$G) at 165° C. for five hours. The temperature was cooled down to room temperature and hydrogen gas was released.

The solution containing the hydrogenated product of the ring-opening metathesis polymer was concentrated until the volume was reduced to half. The concentrate was added into a mixed solution consisting of acetone (800 ml) and methanol (1,200ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,230 and the number average molecular weight Mn was 18,170. Mw/Mn was 1.00. According to the DSC, the glass transition temperature was 207° C.

Comparative Example 1

Ring-opening metathesis polymerization was carried out as in EXAMPLE 1 to obtain a predetermined amount of the ring-opening metathesis polymer powder. Then, 10.00 g of the ring-opening metathesis polymer powder and dichlorotetrakis(triphenylphosphine)ruthenium (5.0 mg, 0.004 mmole) as the hydrogenation catalyst were charged into, and dissolved in, tetrahydrofuran (880 ml) in a 5,000-ml autoclave. Hydrogenation was carried out at a hydrogen pressure of 8.4 Mpa (85 kg/cm$^2$G) at 165° C. for five hours. The temperature was cooled down to room temperature and hydrogen gas was released.

The solution containing the hydrogenated product of the ring-opening metathesis polymer was concentrated until the volume was reduced to half. The concentrate was added into a mixed solution consisting of acetone (800 ml) and methanol (1,200ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 2.8%. According to the GPC, the weight average molecular weight Mw was 18, 100 and the number average molecular weight Mn was 18,020. Mw/Mn was 1.00. According to the DSC, the glass transition temperature was 236° C.

Example 5

In a 500-ml flask with a magnetic stirring device in nitrogen atmosphere was dissolved 8cyanotetracyclo [4.4.0.1$^{2,5}$,1$^{7,10}$]-3-dodecene (1.0 g, 5.42 mmoles) in dry tetrahydrofuran (40 ml). Stirring was carried out. To the solution was added Mo(N-2,6C$_6$H$_3$Pr$^i{}_2$)(CHCMe$_2$Ph) (OBu$^t$)$_2$(30 mg, 0.054 mmole) as the ring-opening metathesis polymerization catalyst. Reaction was carried out for one hour at room temperature. Then, benzaldehyde (25.2 mg, 0.27 mmole) was added to the solution. Stirring was carried out for additional 30 minutes and the reaction was stopped.

Trimethylenediamine (60 mg, 0.81 mmole) was added to the ring-opening metathesis polymer solution. The mixture was transferred to a 200-ml autoclave under nitrogen atmosphere and was mixed at a hydrogen pressure of 0.5 Mpa (4 kg/cm$^2$G) at 60° C. for three hours. The mixture was further added into methanol (200 ml) to precipitate a ring-opening metathesis polymer. The polymer was removed by filtration and dried in vacuo to obtain 1.00 g of the ring-opening metathesis polymer powder.

Then, 1.00 g of the ring-opening metathesis polymer powder was dissolved in dry tetrahydrofuran (54 ml) in a 200-ml autoclave. To the solution was added a dry tetrahydrofuran (6 ml) solution containing dichlorotris (triphenylphosphine)osmium (0.5 mg, 0.0005 mmole) and triethylamine (0.21 mg, 0.0025 mmole) that had been prepared as the hydrogenation catalyst. Hydrogenation was carried out at a hydrogen pressure of 8.5 Mpa (86 kg/cm$^2$G) at 155° C. for five hours. The temperature was cooled down to room temperature and hydrogen gas was released.

The solution containing the hydrogenated product of the ring-opening metathesis polymer was added into a mixed solution consisting of acetone (80 ml) and methanol (120 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,260 and the number average molecular weight Mn was 18,230. Mw/Mn was 1.00. According to the DSC, the glass transition temperature was 209° C.

Example 6

Ring-opening metathesis polymerization was carried out as in EXAMPLE 5 to obtain a ring-opening metathesis polymer solution. To the solution was added a dry tetrahydrofuran (5 ml) solution containing dichlorotris(triphenylphosphine)osmium (0.5 mg, 0.0005 mmole) and triethylamine (0.21 mg, 0.0025 mmole) as the hydrogenation catalyst. Hydrogenation was carried out at a hydrogen pressure of 8.5 Mpa (86 kg/cm$^2$G) at 155° C. for five hours. The temperature was cooled down to room temperature and hydrogen gas was released.

The solution containing the hydrogenated product of the ring-opening metathesis polymer was added into a mixed solution consisting of acetone (80 ml) and methanol (120 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,170 and the number average molecular weight Mn was 18,000. Mw/Mn was 1.01. According to the DSC, the glass transition temperature was 209° C.

Example 7

Ring-opening metathesis polymerization was carried out as in EXAMPLE 5 to obtain a ring-opening metathesis polymer solution. Trimethylenediamine (60 mg, 0.81 mmole) was added to the ring-opening metathesis polymer solution. The mixture was transferred to a 200-ml autoclave in nitrogen atmosphere and was mixed at a hydrogen pressure of 0.5 Mpa (4 kg/cm$^2$G) at 60° C. for three hours. The mixture was further added into methanol (200 ml) to precipitate a ring-opening metathesis polymer. The polymer was removed by filtration. The removed polymer was dissolved in tetrahydrofuran (54 ml) again. Citric acid (0.13 g, 0.54 mmole) was added to the solution. The solution was transferred to a 200-ml autoclave under nitrogen atmosphere and was mixed at a hydrogen pressure of 0.5 Mpa (4 kg/cm$^2$G) at 60° C. for three hours. The mixture was further added into methanol (200 ml) to precipitate a ring-opening metathesis polymer. The polymer was removed by filtration and dried in vacuo to obtain 1.00 g of the ring-opening metathesis polymer powder.

Then, 1.00 g of the ring-opening metathesis polymer powder was dissolved in dry tetrahydrofuran (54 ml) in a 200-ml autoclave. To the solution was added a dry tetrahydrofuran (6 ml) solution containing dichlorotris(triphenylphosphine)osmium (0.5 mg, 0.0005 mmole) and triethylamine (0.21 mg, 0.0025 mmole) that had been prepared as the hydrogenation catalyst. Hydrogenation was carried out at a hydrogen pressure of 8.5 Mpa (86 kg/cm$^2$G) at 155° C. for five hours. The temperature was cooled down to room temperature and hydrogen gas was released.

The solution containing the hydrogenated product of the ring-opening metathesis polymer was added into a mixed solution consisting of acetone (80 ml) and methanol (120 ml) under stirring to precipitate the hydrogenated product of the ring-opening metathesis polymer. The polymer was removed by filtration and was dried in vacuo to obtain a white-powder-like hydrogenated product of the ring-opening metathesis polymer. The hydrogenation rate was estimated from the $^1$H-NMR data of the obtained hydrogenated product of the ring-opening metathesis polymer. The hydrogenation rate was 100% because the peaks resulting from the olefinic protons in the main chain were not observed. According to the GPC, the weight average molecular weight Mw was 18,230 and the number average molecular weight Mn was 18,200. Mw/Mn was 1.00. According to the DSC, the glass transition temperature was 209° C.

Example 8

In a 500 ml autoclave with a magnetic stirring device under nitrogen atmosphere was dissolved 8-tert-butoxycarbonyltetracyclo[4.4.0.1$^{2,5}$.1$^{7,10}$]-3-dodecene (–10.0 g, 38.4 mmoles) in tetrahydrofuran (300 ml). Stirring was carried out. To the solution was added W(N-2,6-C$_6$H$_3$Me$_2$)(CHCHCMe$_2$)(PMe$_3$)(OBu')$_2$(464 mg, 0.77 mmoles) as the ring-opening metathesis polymerization catalyst. Reaction was carried out for one hour at room temperature. Then, butylaldehyde (278 mg, 3.85 mmoles) was added to stop the reaction.

To the ring-opening metathesis polymer solution was trimethylenediamine (570 mg, 7.70 mmoles) and then stirred at 80° C. under 0.49 MPa (4kg/cm$^2$G) as hydrogen pressure for one hour. The mixture was poured into methanol (2000 ml) to precipitate the ring-opening metathesis polymer. Then, the polymer was removed by filtration and dried in vacuo to obtain 10.0 g as the powder.

Then 10.0 g of the ring-opening metathesis polymer powder was dissolved in tetrahydrofuran (800 ml) in 5000 ml autoclave. To the solution was added the solution of hydrogenation catalyst which has been prepared from dichlorotetrakis(triphenylphosphine)ruthenium (5.0 mg, 0.004 mmoles) and triethylamine (2.1 mg, 0.02 mmoles) in tetrahydrofuran (80 ml). Then hydrogenation was carried out at 155° C. and 8.1 MPa (83 kg/cm$^2$G) for five hours. The temperature was cooled down to room temperature and then hydrogen gas was released.

The resulting solution containing the hydrogenated product of ring-opening metathesis polymer was poured into methanol to precipitate the hydrogenated polymer. The polymer was removed by filtration and dried in vacuo to obtain a colorless hydrogenated powder product of the ring-opening metathesis polymer. The hydrogenation rate was estimated from the $^1$H-NMR data of the obtained hydrogenated product of the ring-opening metathesis polymer, which was 100% due to no observation of any peaks derived from the olefinic protons in the main chain of the ring-opening metathesis polymer. The number average molecular weight Mn measured by GPC was 13,000 and Mw/Mn was 1.00.

Example 9

In a 500 ml autoclave with a magnetic stirring device under nitrogen atmosphere was dissolved 8-tert-butoxycarbonyltetracyclo[4.4.0.1$^{2,5}$.1$^{7,10}$]-3-dodecene (–10.0 g, 38.4 mmoles) in tetrahydrofuran (300 ml). Stirring was carried out. To the solution was added W(N-2,6-C$_6$H$_3$Me$_2$)(CHCHCMe$_2$)(PMe$_3$)(OBu$^t$)$_2$ (90 mg, 0.15 mmoles) as the ring-opening metathesis polymerization catalyst and 1,5-hexadiene (493 mg, 6.0 mmoles). Reaction was carried out for one hour at 60° C. Then, butylaldehyde (278 mg, 3.85 mmoles) was added to stop the reaction.

To the ring-opening metathesis polymer solution was trimethylenediamine (570 mg, 7.70 mmoles) and then stirred at 80° C. under 0.49 MPa (4 kg/cm$^2$G) as hydrogen pressure for one hour. The mixture was poured into methanol (2000 ml) to precipitate the ring-opening metathesis polymer. Then, the polymer was removed by filtration and dried in vacuo to obtain 10.0 g as the powder.

Then 10.0 g of the ring-opening metathesis polymer powder was dissolved in tetrahydrofuran (800 ml) in 5000 ml autoclave. To the solution was added the solution of hydrogenation catalyst which has been prepared from dichlorotetrakis(triphenylphosphine)ruthenium (5.0 mg, 0.004 mmoles) and triethylamine (2.1 mg, 0.02 mmoles) in tetrahydrofuran (80 ml). Then hydrogenation was carried out at 165° C. and 8.1 MPa (83 kg/cm$^2$G) for five hours. The temperature was cooled down to room temperature and then hydrogen gas was released.

The resulting solution containing the hydrogenated product of ring-opening metathesis polymer was poured into methanol to precipitate the hydrogenated polymer. The polymer was removed by filtration and dried in vacuo to obtain a colorless hydrogenated powder product of the ring-opening metathesis polymer. The hydrogenation rate was estimated from the $^1$H-NMR data of the obtained hydrogenated product of the ring-opening metathesis polymer, which was 100% due to no observation of any peaks derived from the olefinic protons in the main chain of the ring-opening metathesis polymer. The number average molecular weight Mn measured by GPC was 9,600 and Mw/Mn was 1.33.

Example 10

In a 500 ml autoclave with a magnetic stirring device under nitrogen atmosphere was dissolved 8-tert-butoxycarbonyltetracyclo[4.4.0.1$^{2,5}$.1$^{7,10}$]-3-dodecene (–12.81 g, 49.2 mmoles) and 8-cyanotetracyclo[4.4.0.1$^{2,5}$.1$^{7,10}$]-3-dodecene (6.07 g, 32.8 mmoles) in tetrahydrofuran (300 ml). Stirring was carried out. To the solution was added W(N-2,6-C$_6$H$_3$Me$_2$)(CHCHCMe$_2$)(PMe$_3$)(OBu$^t$)$_2$ (973 mg, 1.64 mmoles) as the ring-opening metathesis polymerization catalyst. Reaction was carried out for one hour at room temperature. Then, butylaldehyde (590 mg, 8.20 mmoles) was added to stop the reaction.

To the ring-opening metathesis polymer solution was trimethylenediamine (570 mg, 7.70 mmoles) and then stirred at 80° C. under 0.49 MPa (4 kg/cm$^2$G) as hydrogen pressure for one hour. The mixture was poured to methanol (2000 ml) to precipitate the ring-opening metathesis polymer. Then, the polymer was removed by filtration and dried in vacuo to obtain 18.88 g as the powder.

Then 10.0 g of the ring-opening metathesis polymer powder was dissolved in tetrahydrofuran (800 ml) in 5000 ml autoclave. To the solution was added the solution of hydrogenation catalyst which has been prepared from dichlorotetrakis(triphenylphosphine)ruthenium (5.0 mg, 0.004 mmoles) and triethylamine (2.1 mg, 0.02 mmoles) in tetrahydrofuran (80 ml). Then hydrogenation was carried out at 165° C. and 8.1 MPa (83 kg/cm$^2$G) for five hours. The temperature was cooled down to room temperature and then hydrogen gas was released.

The resulting solution containing the hydrogenated product of ring-opening metathesis polymer was poured into methanol to precipitate the hydrogenated polymer. The polymer was removed by filtration and dried in vacuo to obtain a colorless hydrogenated powder product of the ring-opening metathesis polymer. The hydrogenation rate was estimated from the $^1$H-NMR data of the obtained hydrogenated product of the ring-opening metathesis polymer, which was 100% due to no observation of any peaks derived from the olefinic protons in the main chain of the ring-opening metathesis polymer. The number average molecular weight Mn measured by GPC was 11,600 and Mw/Mn was 1.00.

We claim:

1. A process for preparing a hydrogenated product of a cyclic olefin ring-opening metathesis polymer which comprises hydrogenating the cyclic olefin ring-opening metathesis polymer of a cyclic olefin represented by the general formula (1):

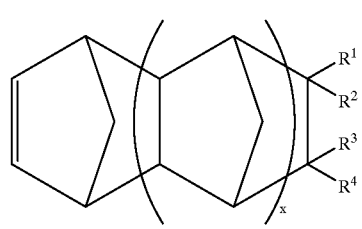

(1)

wherein $R^1$, $R^2$, $R^3$ and $R^4$ are the same of different from each other and are individually one member selected from the group consisting of hydrogen atom, an alkyl group having 1 to 12 carbon atoms, an aryl group, an aralkyl group, an alkoxy group, a halogen atom, a halogenated alkyl group having 1 to 12 carbon atoms, cyano group, carboxyl group and an alkoxycarbonyl group and x is an integer of 0 to 3, in the presence of hydrogen using a hydrogenation catalyst consisting essentially of an amine compound and an organometallic complex represented by the general formula (2):

$$MH_kQ_mT_pZ_q \qquad (2)$$

wherein k is an integer of 0 or 1, m is an integer of 1 to 3, p is an integer of 0 or 1, q is an integer of 2 to 4, M is a ruthenium, rhodium, osmium, iridium, palladium, platinum or nickel atom, H is a hydrogen atom, Q is a halogen atom, T is CO, NO, toluene, acetonitrile or tetrahydrofuran, Z is an organic phosphorous compound represented by the general formula (3):

$$PR'^1R'^2R'^3 \qquad (3)$$

wherein P is phosphorous atom, $R'^1$, $R'^2$ and $R'^3$ are the same or different from each other and are individually one member selected from the group consisting of a linear, branched or cyclic alkyl group, a linear, branched or cyclic alkenyl group, an aryl group, a linear, branched or cyclic alkoxy group and an aryloxy group wherein the equivalent weight ratio of the amine compound to the organometallic complex is in the range of from 0.1 to 1,000.

2. A process for preparing a hydrogenated product of a cyclic olefin ring-opening metathesis polymer according to claim 1 wherein M is a ruthenium atom, Q is a chlorine atom, each of $R'^1$, $R'^2$ and $R'^3$ is a phenyl group, k is 0, m is 2, p is 0 and q is 3.

3. A process for preparing a hydrogenated product of a cyclic olefin ring-opening metathesis polymer according to claim 1 wherein M is a ruthenium atom, Q is a chlorine atom, each of $R'^1$, $R'^2$ and $R'^3$ is a phenyl group, k is 0, m is 2, p is 0 and q is 4.

4. A process for preparing a hydrogenated product of a cyclic olefin ring-opening metathesis polymer according to claim 1 wherein M is a osmium atom, Q is a chlorine atom, each of $R'^1$, $R'^2$ and $R'^3$ is a phenyl group, k is 0, m is 2, p is 0 and q is 3.

5. A process for preparing a hydrogenated product of a cyclic olefin ring-opening metathesis polymer according to claim 1 wherein said amine compound is triethylamine.

* * * * *